Feb. 5, 1924.
E. W. LEECH, JR
1,482,755
LUBRICATING SYSTEM FOR AUTOMOBILES
Filed April 6, 1921
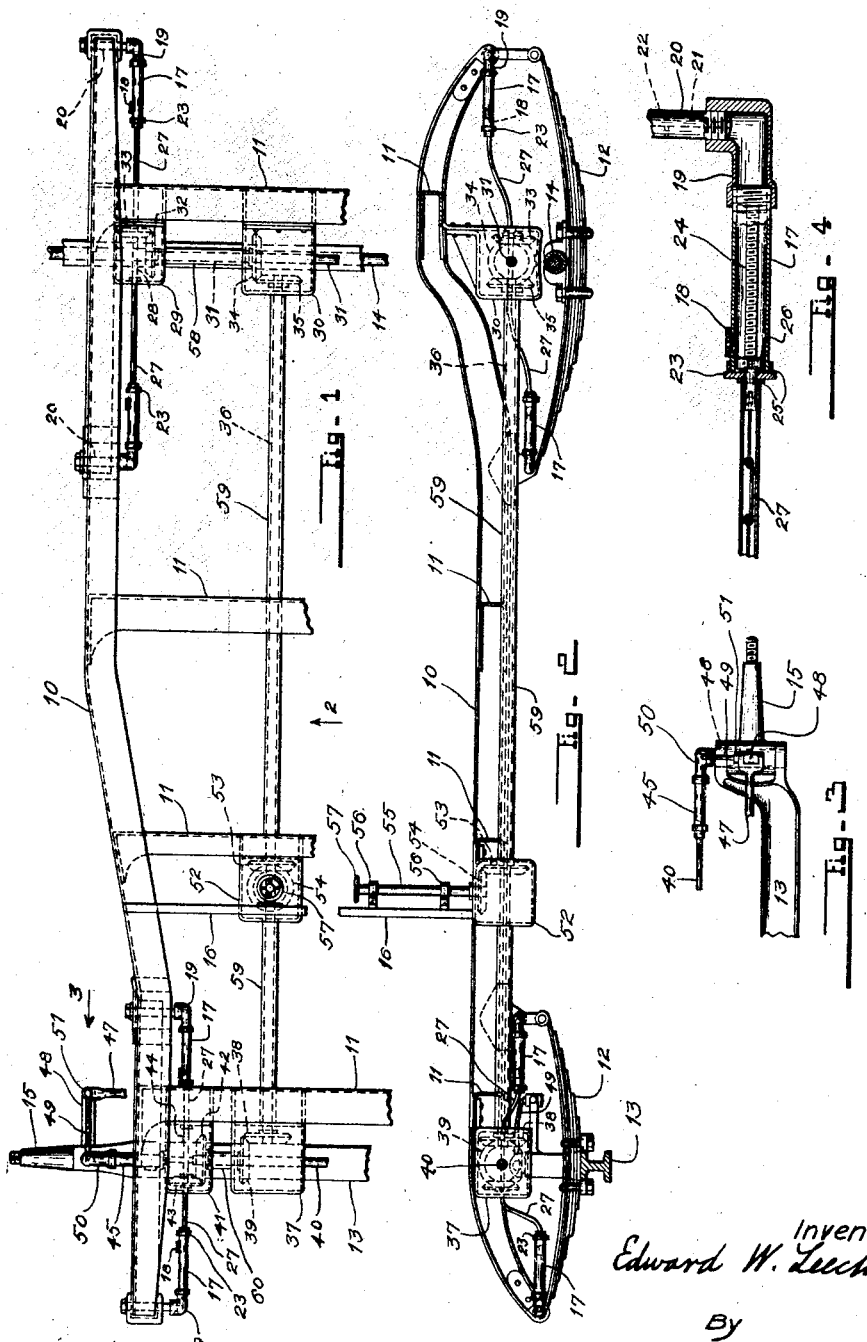
Inventor
Edward W. Leech, Jr.
By John W. Darley.
Attorney Patented Feb. 5, 1924.

1,482,755

UNITED STATES PATENT OFFICE.

EDWARD W. LEECH, JR., OF BALTIMORE, MARYLAND.

LUBRICATING SYSTEM FOR AUTOMOBILES.

Application filed April 6, 1921. Serial No. 458,921.

*To all whom it may concern:*

Be it known that I, EDWARD W. LEECH, Jr., a citizen of the United States, residing at Baltimore, in the State of Maryland, have invented certain new and useful Improvements in Lubricating Systems for Automobiles; and I do hereby declare the following to be a full, clear, and exact description of the invention, such as will enable others skilled in the art to which it appertains to make and use the same.

My invention relates to lubricating systems for automobiles.

The object of my invention is to provide a lubricating system having a plurality of receptacles for lubricants, located to lubricate the various parts of an automobile and combining therewith a mechanical arrangement for positively forcing the lubricant upon the parts to be lubricated. The mechanical arrangement for forcibly ejecting the lubricant from the receptacles is preferably operated from one point, but it may be arranged to be operated from a plurality of points.

Heretofore, the spring shackles, steering knuckles and other parts of an automobile chassis requiring lubrication have been provided with individual grease cups which require individual adjustment. By my invention, the adjustment of all of the grease cups is effected simultaneously by the operation of a single manually operated handle. The handle is preferably located adjacent to the instrument board so that it may be operated even while the car is in operation.

In carrying out my invention I make use of the instrumentalities illustrated in the accompanying drawings, in which:

Figure 1 is a plan view of one side of an automobile chassis equipped with my improved lubricating system.

Fig. 2 is a view of the parts shown in Fig. 1 looking in the direction of the arrow 2 in said figure.

Fig. 3 is a view of the steering knuckle shown in Fig. 1 looking in the direction of the arrow 3 in said figure.

Fig. 4 is a sectional view of one of my improved grease cups.

In the drawings:

10 is a side frame of the chassis which is provided with usual cross bars such as 11, springs 12, front axle 13, rear axle 14, steering knuckle 15 and instrument board 16, all of these parts being of any usual or approved construction and they form no part of my invention.

For the sake of clearness, in the drawings I shall not illustrate my invention as applied to all the parts of an automobile chassis requiring lubrication, but it is to be understood that the same system can be applied wherever lubrication of a part is desired.

17 represents the casing of a grease cup provided with a filling hole closed by the cap 18. One end of the casing 17 is screwed into one end of the nipple 19 which may be angular as shown in Fig. 4, or straight or curved. The other end of the nipple 19 is screwed upon the bolt 20 which may be the bolt of a spring shackle or other part requiring lubrication. The bolt 20 is provided with a central aperture 21 which communicates with the interior of the nipple 19 and with one or a plurality of cross apertures such as 22 for conducting the lubricant to the exterior of the bolt 20.

A cap 23 is threaded upon the free end of the casing 17 and has a central aperture in which is revolubly mounted the screw 24, shoulders such as 25 preventing endwise displacement of said screw with reference to said cap.

A plunger 26 fitting snugly within the casing 17 is threaded upon the screw 24. The outer end of the screw 24 is connected to one end of a flexible shaft 27 and the other end of said shaft is connected to means for revolving the same.

Referring to the right hand ends of Figs. 1 and 2, the shafts 27 are connected to the shaft 28, the latter being revolubly mounted in the housing 29. A second housing 30 is mounted in any approved manner upon the chassis and a shaft 31 has an end revolubly mounted in each of the housings 29 and 30. The end mounted in the former is secured to the bevel gear 32 which meshes with the bevel gear 33 secured upon the shaft 28. The bevel gear 34 is fixed upon the shaft 31 and meshes within the housing 30 with the bevel gear 35, the latter being secured upon the shaft 36. The shaft 36 has one end revolubly mounted in the housing 30 and its other end is revolubly mounted in the housing 37 within which there is fixed upon said shaft the bevel gear 38 which meshes with the bevel gear 39, the latter being secured to the shaft 40. The shaft 40 extends within the housing 41 and within said housing upon said shaft there is fixed the bevel gear 42 which meshes with the gevel gear 43, the latter being fixed upon the shaft 44 which is revolubly mounted in the housing 41. The shaft 44 is connected to the flexible shafts 27 which operate plungers within the casings 17—17 to lubricate the shackles of the front spring. The shaft 40 extends towards the steering knuckle 15 as shown in Figs. 1 and 3 and operates a plunger within the casing 45, the interior of which communicates with the bolt 46 of the steering knuckle.

In order to lubricate the connection of the cross rod 47 with the arm 48 of the steering knuckle 15, a flexible tube 49 is connected at one end to the nipple 50 and at its other end to the bolt 51 which articulates the rod 47 with the arm 48.

The shaft 36 passes freely through the housing 52 and within said housing there is fixed upon said shaft the bevel gear 53 which meshes with the bevel gear 54 fixed to the vertical shaft 55, the latter being revolubly mounted in bearings 56—56 secured upon the instrument board 16.

A hand wheel 57 provides means for turning the shaft 55. Tubes such as 58, 59 and 60 serve to shield the shafts 31, 36 and 40 from interference or injury.

The operation of my improved lubricating system is as follows:—

It is to be noted that the casings 17 and 45 are to be made large so as to hold a comparatively large amount of lubricant. They are to be filled through the hole closed by the cap 18, the plunger 26 being adjacent to the cap 23.

It is to be noted that the construction of the parts within the casing 45 is the same as that of the parts within the casing 17.

Prior to filling the casings 17 and 45, the handle 57 is to be turned in such a direction that the screws 24 will move the plungers 26 to the position shown in Fig. 4. The casings being filled with lubricant then by turning the hand wheel 57 in the proper direction, the various mechanical connections to the screws 24 will be operated in such directions that said screws will force the plungers 26 away from the caps 23, thus forcing the lubricant out through the apertures 21 and 22 and lubricating the parts.

Thus it will be seen that I provide a simple, cheap and efficient means for lubricating all the parts of an automobile by the movement of one handle.

While I have shown the hand wheel 57 as an operating means for my improved lubricating system, it is to be understood that I do not desire to be limited to such means. The shaft 55 may be operated by automatic means if desired.

While I have shown my improved lubricating system as applied to automobiles, it is to be understood that it may be used for many other purposes.

It is also to be understood that while I have shown but one form of my invention, many changes may be made therein without departing from the spirit thereof.

I claim:—

1. In a lubricating system for automobiles, the combination with an automobile comprising a chassis and running gear comprising bearings and having movements relative to said chassis, of casings for lubricant connected to said bearings, means in said casings for forcing said lubricant to said bearings, means on said chassis for operating said first named means and flexible operating connections between said means.

2. In a lubricating system for automobiles, the combination with an automobile comprising a chassis and running gear comprising bearings and having movements relative to said chassis, of casings for lubricant connected to said bearings, means in said casings for forcing said lubricant to said bearings, unitary means on said chassis for operating said first named means and flexible operating connections between said means.

3. In a lubricating system, the combination of a plurality of casings connected to a plurality of parts to be lubricated and lubricant in said casings, of screws revolubly mounted in said casings, plungers threaded upon said screws, flexible shafts connected to said screws and unitary means for revolving said shafts.

4. In a lubricating system, the combination of a plurality of casings connected to a plurality of parts to be lubricated and lubricant in said casings, of means in said casings for forcing said lubricant to said parts, flexible shafts each having one end connected to one of said means for operating same, gears connected to the other ends of said flexible shafts, unitary operating means and connections from said operating means to said gears.

In testimony whereof, I affix my signature.

EDWARD W. LEECH, Jr.